(12) United States Patent
Shuster

(10) Patent No.: US 7,406,708 B2
(45) Date of Patent: Jul. 29, 2008

(54) SYSTEM AND METHOD FOR SERVING CONTENT OVER A WIDE AREA NETWORK

(75) Inventor: Gary Stephen Shuster, Fresno, CA (US)

(73) Assignee: Hoshiko LLC, Henderson, NV (US)

( * ) Notice: Subject to any disclaimer, the term of this patent is extended or adjusted under 35 U.S.C. 154(b) by 0 days.

(21) Appl. No.: 11/681,051

(22) Filed: Mar. 1, 2007

(65) Prior Publication Data

US 2007/0157293 A1 Jul. 5, 2007

Related U.S. Application Data

(63) Continuation of application No. 09/860,669, filed on May 16, 2001, now Pat. No. 7,200,863.

(60) Provisional application No. 60/204,995, filed on May 16, 2000.

(51) Int. Cl.
*G06F 7/04* (2006.01)
(52) U.S. Cl. .................. 726/4; 726/2; 726/21
(58) Field of Classification Search .............. 726/4, 726/21, 2
See application file for complete search history.

(56) References Cited

U.S. PATENT DOCUMENTS

| | | | |
|---|---|---|---|
| 6,049,835 A | 4/2000 | Gagnon | |
| 6,061,660 A | 5/2000 | Eggleston et al. | |
| 6,351,467 B1 | 2/2002 | Dillon | |
| 6,374,359 B1 | 4/2002 | Shrader et al. | |
| 6,442,602 B1 | 8/2002 | Choudhry | |
| 6,449,657 B2 * | 9/2002 | Stanbach et al. | 709/245 |
| 6,654,891 B1 | 11/2003 | Borsato et al. | |
| 6,665,634 B2 | 12/2003 | Taft et al. | |
| 6,678,827 B1 * | 1/2004 | Rothermel et al. | 726/6 |
| 6,687,732 B1 | 2/2004 | Bector et al. | |
| 6,789,115 B1 | 9/2004 | Singer et al. | |
| 6,792,474 B1 | 9/2004 | Hopprich et al. | |
| 2001/0007099 A1 | 7/2001 | Rau et al. | |
| 2001/0029466 A1 * | 10/2001 | Ichihara | 705/14 |
| 2001/0032154 A1 * | 10/2001 | Schummer | 705/30 |

OTHER PUBLICATIONS

Mockapetris, Paul V., et al., "Development of the Domain Name System", 1988 pp. 123-133.
Mockapetris, Paul V., et al., "Domain Names, Concepts and Facilities", 1987, pp. 1-46.

\* cited by examiner

*Primary Examiner*—Ellen Tran
(74) *Attorney, Agent, or Firm*—Connolly Bove Lodge & Hutz LLP; Jonathan A. Jaech

(57) ABSTRACT

A system and method is provided for using a DNS server operating on a wide area network to enable an authorized reception device to receive (or be provided with) restricted content data associated with a particular wide area network address and redefine the domain name associated with a particular wide area network address. In a preferred embodiment of the present invention, an authorization application is adapted to provide the reception device with user-verification data, receive from the reception device verification data, and provide the filtering application with authorization data. The filtering application, which operates similarly to prior art DNS server systems, is further adapted to receive filtered data (i.e., password-required data and/or pseudo-domain-name data) and authorization data in order to provide an IP address of the content server to the reception device via a wide area network, such as the Internet.

35 Claims, 6 Drawing Sheets

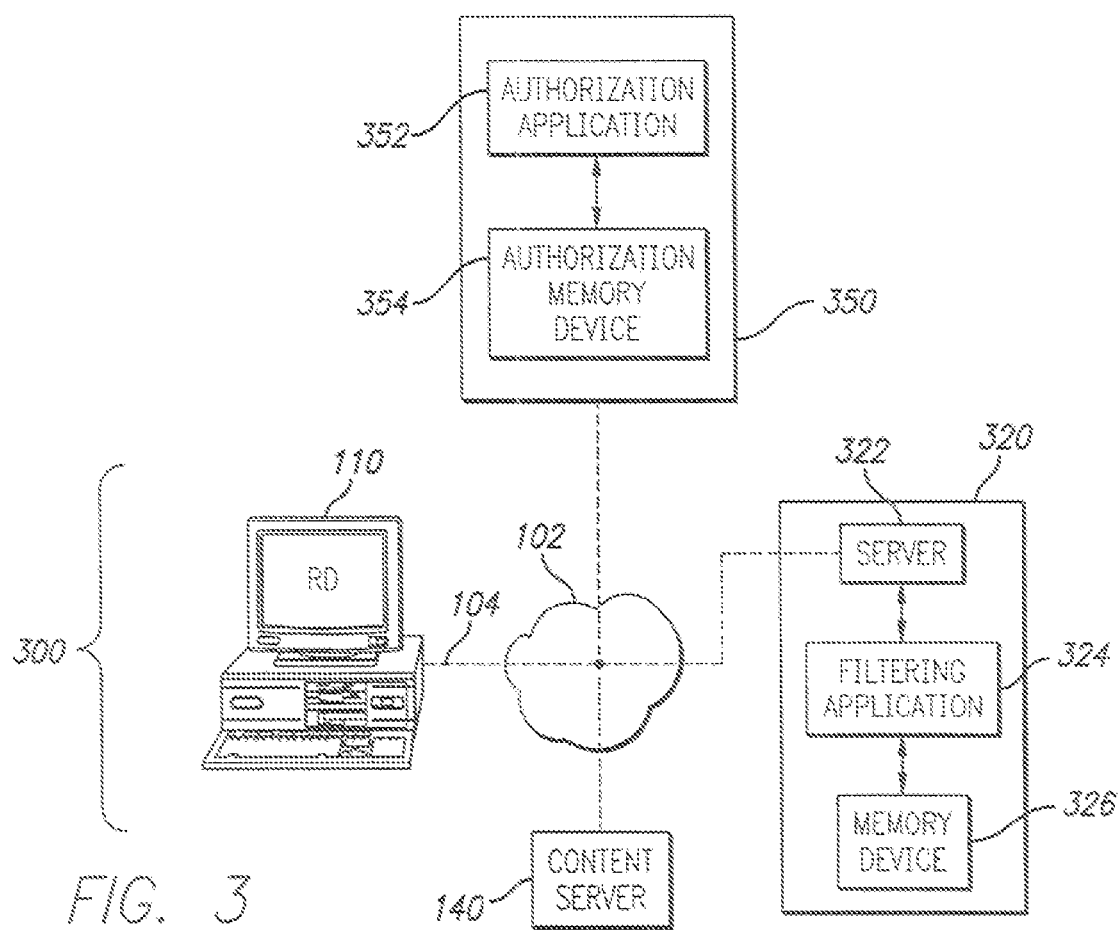

FIG. 4

| USER ID | PSEUDO LINKED | PSEUDO DOMAIN NAME | DOMAIN NAME | PASSWORD REQUIRED | PASSWORD | IP ADDRESS |
|---|---|---|---|---|---|---|
| George | YES | News | cnn.com | No | | 207.24.245.178 |
| George | YES | Software | microsoft.com | No | | 213.199.144.151 |
| Michael | YES | News | msnbc.com | No | | 207.46.232.38 |
| | NO | | sex.com | Yes | 123 | 209.81.54.5 |

| USER ID | DOMAIN NAME | REDIRECTED DOMAIN NAME | PASSWORD REQUIRED | PASSWORD | IP ADDRESS |
|---|---|---|---|---|---|
| George | sex.com | filtered.sex.com | Yes | 123 | 209.81.54.5 |
| Michael | adult.com | level3.adult.com | Yes | 123 | 216.99.40.3 |

700

SYSTEM AND METHOD FOR SERVING CONTENT OVER A WIDE AREA NETWORK

CROSS REFERENCE TO RELATED APPLICATIONS

This application is a continuation of U.S. application Ser. No. 09/860,669 filed May 16, 2001, now U.S. Pat. No. 7,200,863 which claims priority pursuant to 35 U.S.C. § 119(e) to U.S. Provisional Application Ser. No. 60/204,995, filed May 16, 2000, which applications are specifically incorporated herein, in their entirety, by reference.

BACKGROUND OF THE INVENTION

1. Field of the Invention

The present invention relates to filtering content data over a wide area network and, more particularly, to a system and method for using a DNS server operating on a wide area network to enable an authorized reception device to receive (or be provided with) restricted content data associated with a particular wide area network address and redefine the domain name associated with a particular wide area network address.

2. Description of Related Art

Wide area networks, such as the Internet, are commonly used to share information between multiple computing devices. This is done by storing information at an address that is recognizable to a remote computing device, and linking that address to a name that is recognizable to a person operating that remote computing device. With regard to the Internet, information is stored at Internet Protocol (IP) addresses, and those IP addresses are linked to particular domain names. This linked information (i.e., between IP addresses and particular domain names) is provided to the multiple computing devices through the use of a domain name system (DNS) server.

DNS servers are generally used servers (i.e., used by more than one remote computing device) that provide remote computing devices with IP address information. If a remote computing device is instructed to gather information pertaining to a particular domain name, the remote computing device communicates with a DNS server to retrieve the IP address associated with that particular domain name. The DNS server uses a look-up table, which contains linked information between IP addresses and domain names, to determine what IP address is associated with that particular domain name. The DNS server then provides the proper IP address to the remote computing device. The remote computing device can then gather information (as originally instructed) by requesting the information from a content server operating on that IP address.

There are two main problems associated with such an information location system. These problems stem from the fact that the remote computing devices retrieve information in roughly the same manner. That is, each remote computing device requests information from IP addresses that are provided by generally used DNS servers. Thus, the first problem associated with such a system is that each remote computing device must install is own content blocking software in order to limit the nature and explicitness of the information that it is capable of retrieving. Without this content blocking software, particular individuals (e.g., children, uninterested adults, etc.) can access (or be provided with) information of a sensitive nature (e.g., sex, violence, drugs, religion, etc.). The problem with using content blocking software is that it can be expensive and can decreases the processing speed of, and eliminate valuable memory space on the individual reception devices. Additionally, such software may eventually become outdated, may be cumbersome to upgrade (e.g., difficult and/or time consuming), and may even be circumvented by a sophisticated user.

The second problem associated with such an information location system is that all the remote computing devices must adhere to some industry standard domain name system (i.e., linking fixed IP addresses to predefined individualized domain names) in order to retrieve (or be provided with) information. Thus, a sports-minded individual on a particular remote computing device who enjoys receiving information from the domain name "people.preview.news.basketball.sports.msnbc.com" must continually type in this cumbersome domain name in order to receive information from the IP address associated with that domain name. If the sports-minded individual alters this domain name, either by accident (due to its cumbersome size), or intentionally (attempting to produce a shorter or more sensible name), the individual may be provided with an error message or incorrect information from another IP address that is associated with the incorrect domain name. Additionally, an individual attempting to distribute information over a particular wide area network, such as the Internet, may have a hard time finding a domain name that is easy to remember, is related to his information, is not already being used by another, and is not legally prohibited (e.g., due to trademark law, unfair competition, etc).

Thus, a need and a desire exists to have a DNS server system operating on a wide area network that enables an authorized reception device to receive (or be provided with) restricted content data associated with a particular wide area network address and redefine the domain name associated with a particular wide area network address.

SUMMARY OF THE INVENTION

The present invention provides a system and method for using a DNS server operating on a wide area network to enable an authorized reception device to receive (or be provided with) restricted content data associated with a particular wide area network address and redefine the domain name associated with a particular wide area network address. In a preferred embodiment of the present invention, a DNS server system includes a reception device, a content server, an authorization server and a DNS server, where the authorization server further includes an authorization memory device and an authorization application, and the DNS server further includes a memory device, a server, and a filtering application. The authorization application is adapted to provide the reception device with user-verification data, receive from the reception device verification data (i.e., password data, user-identification data, and pseudo-domain-name data), and provide the filtering application with authorization data. The filtering application, which operates similarly to prior art DNS server systems, is further adapted to receive filtered data (i.e., password-required data and/or pseudo-domain-name data) and authorization data in order to provide an IP address of the content server to the reception device via a wide area network, such as the Internet.

If the filtering application receives password-required data pertaining to a particular domain name (e.g., "sex.com"), then the filtering application is further adapted to store a link between the password-required data and the pertaining domain name in the memory device. If a reception device subsequently requests the IP address for the particular domain name (e.g., "sex.com"), then the filtering application is further adapted to provide the reception device with an IP address for the authorization server. The authorization application operating on the authorization server is adapted to provide the reception with user-verification data, which may include, but is not limited to, request-for-user-identification data (i.e., verifying a user through their user name), request-for-password data (i.e., verifying a user through a pre-selected password), or request-for-credit-card data (i.e., verifying a user through their credit card account). The authorization application is further adapted to receive verification data from the reception device, which may include, but is not limited to, password data, user-identification data, (e.g., user name or credit card information), and pseudo-domain-name data. If the authorization application identifies the reception device as being an authorized reception device (i.e., by verifying the received verification data), then the authorization application is adapted to provide the filtering application with authorization data (e.g., the IP address of the reception device) and redirect (or refresh) the reception device such that the reception device requests the IP address for the particular domain name (e.g., "sex.com") from the DNS server. The filtering application operating on the DNS server is further adapted to provide the reception device with the requested IP address after the authorization data has been received.

If the filtering application receives pseudo-domain-name data (e.g., "news") pertaining to a particular domain name (e.g., "cnn.com"), then the filtering application is further adapted to store a link between the pseudo-domain-name data and the pertaining domain name in the memory device. If a reception device subsequently requests an IP address for the pseudo-domain-name data (e.g., "news"), the reception device will be provided with the IP address of the particular domain name (e.g., "cnn.com"). Alternatively, if the filtering application has not received pseudo-domain-name data pertaining to a particular domain name, then the filtering application may be adapted to provide the reception device with an IP address for the authorization server. The authorization application operating on the authorization server may be adapted to provide the reception device with user-verification data (as discussed above) in order to link the pseudo-domain-name data (e.g., "news") to a particular user. This allows the authorization application (together with the filtering application) to subsequently provide that particular user with an IP address for the particular domain name (e.g., "cnn.com") when the user requests an IP address for the pseudo-domain-name data (e.g., "news").

The authorization application may further be adapted to receive (or generate) pseudo-linked data (which links pseudo-domain-name data to domain names) and circumventing data, such that the link between the pseudo-domain-name data and a particular domain name is circumvented. That is, the circumventing data may temporarily mask the pseudo-linked data, such that a reception device would have to provide the DNS server with the actual domain name in order to receive an IP address associated with that actual domain name.

In another embodiment of the present invention, the authorization application is further adapted to provide a redirected URL (uniform resource locator) to the reception device after the reception device has provided verification data. This allows a content providing application operating on the content server to recognize (or search for) the redirected URL (or a coded token within the redirected URL) before providing a reception device with content data. It should be appreciated that the redirected URL (or a coded token within the redirected URL) may prevent a reception device from receiving content data, may enable a reception device to receive content data, or may enable a reception device to receive a predefined level of content data. To prevent a user from easily circumventing this system, the content providing application may further be adapted to deny requests for content data when the request contains an IP address. To reward users, the content providing application may further be adapted to provide users with special savings or benefits for using the DNS server or the pseudo-domain-name data contained within the memory device of the DNS server.

A more complete understanding of the system and method for filtering content data over a wide area network will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 2 is a chart illustrating a prior art look-up table used by the prior art DNS server system depicted in FIG. 1.

FIG. 3 is a block diagram illustrating a preferred embodiment of the DNS server system of the present invention.

FIG. 4 is a chart illustrating a preferred embodiment of the look-up table used by the DNS server system of the present invention.

FIG. 7 is a chart illustrating another embodiment of the look-up table used by the DNS server system of the present invention.

DETAILED DESCRIPTION OF THE PREFERRED EMBODIMENT

The present invention provides a system and method for using a DNS server operating on a wide area network to enable an authorized reception device to receive (or be provided with) restricted content data associated with a particular wide area network address and redefine the domain name associated with a particular wide area network address. In the detailed description that follows, like element numerals are used to describe like elements illustrated in one or more figures.

Figure 1:
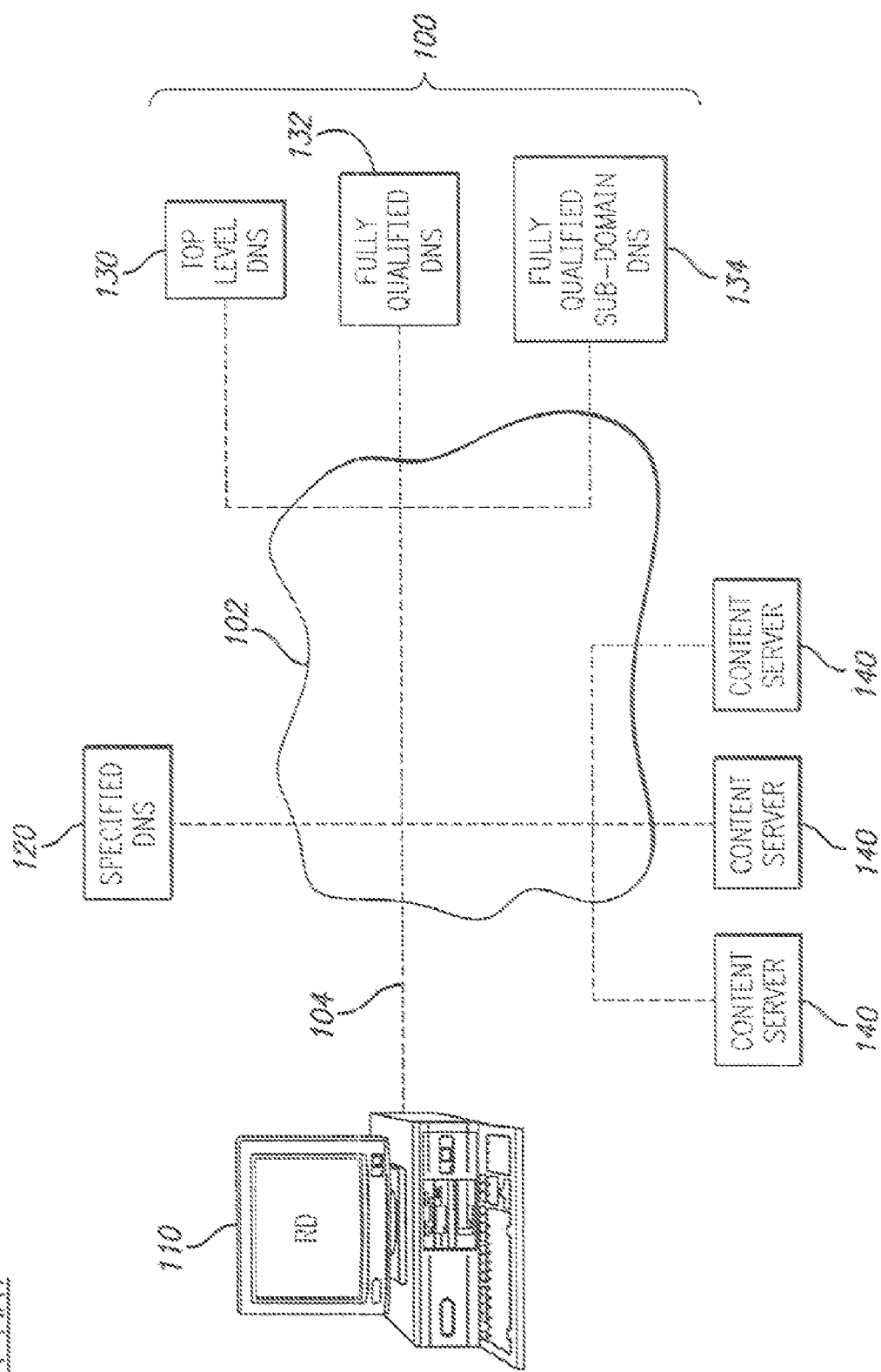
FIG. 1 is a block diagram illustrating a prior art DNS server system that provides IP address data to at least one reception device.

In order to best describe the preferred embodiment of the present invention, the configuration and operation of a prior art DNS server system 100, as depicted in FIG. 1, will first be described. In the prior art DNS server system 100, before a reception device 110 can receive content data from a content server 140, the reception device 110 must usually communicate with a DNS server (e.g., a specified DNS server 120) in order to retrieve the IP address associated with that content server 140. This is because the reception device 110 typical requests content data by designating a domain name (e.g., "cnn.com") associated with the content data instead of designated the address (e.g., the IP address) where such content data is located. The reason the reception device requests content data by designating a domain name (e.g., "cnn.com") is mainly due to the fact that IP addresses are complex and hard to remember. IP addresses generally take the form of a four byte machine code (expressed in base ten format), with each byte separated by a period. Thus, each IP address resides somewhere between "0.0.0.0" and "255.255.255.255" (as shown in FIG. 2). Domain names, on the other hand, are much easier to recognize (or remember). Domain names generally contain a "TopLevelDomainName," a "FullyQualifiedDomainName," and at least one "SubDomain," where each level is separated by a period. Thus, an individual domain name may be expressed as follows: ". . . SubDomain2. SubDomain1.FullyQualifiedDomainName.TopLevelDomain Name." For example, in the domain name "cnn.com", the "com" portion is the "TopLevelDomainName," whereas the "cnn" portion is the "FullyQualifiedDomainName." If CNN wanted a separate address for news, a "SubDomain1" could be created (e.g., "news.cnn.com"). If CNN further wanted a separate address for people in the news, a "SubDomain2" could be created (e.g., "people.news.cnn.com"). A further categorization of information could continue if desired (i.e., by creating "SubDomain3," "SubDomain4," etc).

Although a reception device 110 could contact any DNS server to receive IP address information, most reception devices (e.g., 110) are configured to communicate with a single specified DNS server 120. The specified DNS server 120 is a generally used DNS server (i.e., used by more than one reception device 110) that can be contacted whenever an IP address is not known. Each reception device 110 typically designates at least one specified DNS server 120 to perform this function. The reception device 110 communicates with the specified DNS server 120 by providing the specified DNS server 120 with a particular domain name (e.g., "cnn.com"). The specified DNS then uses a prior art look-up table, as shown in FIG. 2, to determine the IP address associated with that particular domain name.

For example, if the reception device 110 is instructed to receive content data from "cnn.com," then the reception device 110 sends an IP address request to the specified DNS server 120. The specified DNS server 120 would search for "cnn.com" in the domain name column 250 of the look-up table 200, and provide the reception device 110 with a corresponding IP address (i.e., "207.24.245.278"). If the reception device 110 requests an IP address of a domain name that is not listed under the domain name column 250 of the look-up table 200, such as "people.news.msnbc.com," then the specified DNS server 120 may have to request a corresponding IP address from another DNS server, such as a top level DNS server 130, a fully qualified DNS server 132, or a fully qualified sub-domain DNS server 134 (see FIG. 1).

In order to provide the reception device 110 with an IP address associated with "people.news.msnbc.com," the specified DNS server 120 may begin by retrieving the IP address of "msnbc.com" by requesting such information from the top level (i.e., "com") DNS server 130, which contains the IP addresses of all the "FullyQualifiedDomainNames" (e.g., "msnbc") located under a specific "TopLevelDomainName" (i.e., "com"). The specified DNS server 120 may then retrieve the IP address of "news.msnbc.com" by requesting such information from the fully qualified (i.e., "msnbc")DNS server 132, which contains the IP addresses of all the "SubDomain1s" (e.g., "news") located under a specific "FullyQualifiedDomainName" (i.e., "msnbc") and its accompanying "TopLevelDomainName" (i.e., "com"). The specified DNS server 120 may then retrieve the IP address of "people.news.msnbc.com" by requesting such information from the fully qualified sub-domain (i.e., "news") DNS server 134, which contains the IP addresses of all the "SubDomain2s" (e.g., "people") located under a specific "SubDomain1" (i.e., "news") and its accompanying "FullyQualifiedDomainName" (i.e., "msnbc") and "TopLevelDomainName" (i.e., "com"). Once the IP address for "people-.news.msnbc.com" is received, it can be provided to the reception device 110. For future reference, the domain name (i.e., "people.news.msnbc.com") and its IP address may also be stored in empty memory cells under the domain name column 250 and IP address column 260 within the prior art look-up table 200.

Once the reception device 110 receives the IP address for a particular domain name, the reception device 110 can send a content data request to the content server 140 operating on the IP address, where the content server request usually takes the form of a uniform resource locator (URL) or a domain name. For example, if the reception device 110 was instructed to receive content data from CNN's home page, then the reception device 110 may send a content data request, such as "cnn.com" or "cnn.com/home" to IP address "207.24.245.278" (i.e., the IP address associated with "cnn.com"). The content server operating on that IP address (e.g., 140) would then provide the reception device 110 with the content data references by such a request (e.g., content data associated with "cnn.com" or "cnn.com/home"). It should be noted, that with the prior art DNS server system 100, if another reception device (not shown) was to request the IP address associated with "cnn.com" from the specified DNS server 120, the same IP address would be given. This is because the link between the domain name and the IP address (as listed within the prior art look-up table 200) is not user specific.

Preferred embodiments of the present invention operates in accordance with at least one reception device, at least one content server, an authorization server and a DNS server adapted to communicate with the at least one reception device, the at least one content server, and the authorization server. FIG. 3 illustrates a preferred embodiment of the DNS server system 300 of the present invention. In this preferred embodiment, the DNS server system 300 includes a reception device 110, a content server 140, an authorization server 350 and a DNS server 320 communicating through a wide area network 104, such as the Internet 102. It should be appreciated that the reception device 110 depicted in FIG. 3 includes, but is not limited to, personal computers, set top boxes, televisions, personal digital assistances (PDAs), mobile phones, and all other physically and wirelessly connected reception devices generally known to those skilled in the art. It should further be appreciated that the number of reception devices 110, content servers 140, and authorization servers 350 depicted in FIG. 3 is merely to illustrate how the present invention operates, and is not intended to further limit the present invention.

The DNS server 320 of the DNS server system 300 further includes a memory device 326, a server 322, and a filtering application 324 adapted to provide the IP address of the content server 140 to the reception device 110 via the wide area network 104, such as the Internet 102. The authorization server 350 of the DNS server system 300 further includes an authorization memory 354 and an authorization application 352 adapted to authenticate the reception device 110. It should be appreciated that the memory devices 326, 354 depicted in FIG. 3 include, but are not limited to, RAM, cache memory, flash memory, magnetic disks, optical disks, removable disks, SCSI disks, IDE hard drives, tapes drives, smart cards, and all other types of data storage devices (and combinations thereof, such as RAID devices) generally known to those skilled in the art. It should also be appreciated that the filtering application 324 and the authorization application 352 depicted in FIG. 3 may exist as single applications, or as multiple applications (locally and/or remotely stored) that operate together to perform their respective required functions as described below. It should be further appreciated that the number of components (i.e., server 322, filtering application 324, and memory device 326) depicted within the DNS server 320, and the number of components (i.e., authorization application 352 and authorization memory 354) depicted within the authorization server 350 are merely to illustrate how the invention operates, and are not intended to further limit the invention. Thus, for example, a DNS server 320 having a greater number of (or additional) components is within the spirit and scope of this invention.

The filtering application 324 and/or the authorization application 350 operates in conjunction with a preferred embodiment look-up table 400, as depicted in FIG. 4. It should appreciated that the data contained with the look-up table 400 may (or may not) be not stored in one central location. This data may be stored entirely in the memory device 326, entirely in the authorization memory device 354, or partly in either. For example, storing only the data contained under the domain name column 250, the password required column 440, and the IP address column 260 in the memory device 326 is within the spirit and scope of this invention. It should be appreciate that this data is shown in a single figure (i.e., FIG. 4) merely to describe the operation of the present invention, as is not intended to operate as a limitation on the invention.

The filtering application 324, which operates similarly to prior art DNS server systems, is further adapted to receive filtered data (i.e., password-required data and/or pseudo-domain-name data) and authorization data in order to provide an IP address of the content server 140 to the reception device 110 via a wide area network 104, such as the Internet 102. The filtered data, which may include password-required data, can be stored in a password-required column 440 of the preferred look-up table 400. It should be appreciated that the password-required data may be provided by other entities (i.e., other than the reception device 110) including, but not limited to, a content server 140 or a system administrator (not shown) of the DNS server system 300. It should also be appreciated that the authorization application 352 may further be adapted to provide the filtering application 324 with password-required data. The authorization application 352 may perform this function by being adapted to search for restricted content data on a content server (e.g., 140) operating on an IP address that is not already linked to password-required data. If the authorization application 352 locates any restricted content data on that content server, then the authorization application 352 may provide the filtering application 324 with password-required data.

If the filtering application 324 receives password-required data pertaining to a particular domain name (e.g., "sex.com"), then the filtering application is further adapted to store a link between the password-required data and the pertaining domain name in the memory device 326 (i.e., in the preferred look-up table 400 that may (in-part) be located in the memory device 326). It should be appreciated that the password-required data may alternatively pertain to a particular IP address, such that a link is stored between the password-required data and the pertaining IP address. Either form may be acceptable due to the fact that each domain name is already associated with a particular IP address. If a reception device 110 subsequently requests an IP address associated with the particular domain name, then the filtering application 324 is further adapted to provide the reception device 110 with the IP address of the particular domain name if the filtering application 324 can verify that the reception device 110 is an authorized reception device. This may be done by receiving (and verifying) the reception device's IP address or an authorized password embedded within the reception device's request for an IP address. Alternatively the filtering application 324 is adapted to provide the reception device 110 with an IP address for the authorization server 350.

The authorization application 352, which is operating on the authorization server 350, is adapted to provide the reception device with user-verification data, which may include, but is not limited to, request-for-user-identification data (i.e., verifying a user through their user name), request-for-password data (i.e., verifying a user through a pre-selected password), or request-for-credit-card data (i.e., verifying a user through their credit card account). The authorization application 352 is further adapted to receive verification data from the reception device 110, which may include, but is not limited to, password data and user-identification data (e.g., user name or credit card information). If the authorization application 352 identifies the reception device 110 as being an authorized reception device (i.e., by verifying the received verification data based upon previously received data or acquired data), then the authorization application is adapted to provide the filtering application 324 with authorization data (e.g., the IP address of the reception device) and provide the reception device 110 with redirect (or refresh) data such that the reception device 110 requests the previously requested IP address for the particular domain name (e.g., "sex.com") from the DNS server 320. The filtering application 324 operating on the DNS server 320 is further adapted to provide the reception device with the requested IP address after the authorization data has been received. It should be appreciated that the authorization application 352 may further be adapted to store a link between the particular domain name (or IP address) and the user-identification data (e.g., "George", "Michael"). This would allow the authorization application 352 to receive verification data specifically pertaining to a particular domain name (or IP address).

For example, referring to FIG. 4, if password-required data (e.g., "YES") is received pertaining to "sex.com", then the password-required data will be stored in the password-required column 440 such that it is linked with the pertaining domain name (i.e., "sex.com", stored in the domain name column 250). If a reception device 110 was to subsequently request an IP address for "sex.com", the filtering application 324 may provide the reception device 110 with the IP address for "sex.com" (i.e., "209.81.54.5") if the filtering application 324 can verify that the reception device 110 is an authorized reception device. The filtering application 324 may use the reception device's IP address or password data contained directly within an IP address request (i.e., directly within the domain name provided by the reception device 110) to authenticate the reception device 110. For example, the filtering application 324 may provide the reception device 110 with the IP address for "sex.com" if the filtering application 324 receives a request for the IP address "password.sex.com."

Alternatively, the filtering application 324 may provide the reception device 110 with an IP address of the authorization server 350. The authorization application 352 operating on the authorization server 350 is adapted to provide the reception device 110 with user-verification data (e.g., request-for-user-identification data or request-for-password data). It should be appreciated that this method (and other methods previously referred to with regards to the filtering application 324) of identifying a user may also include (or operate in conjunction with) tracking/verifying passwords through Pentium III processor Ids, tracking/verifying passwords through MAC address for Ethernet cards, tracking/verifying a user through the measurement of response times (such as "ping" times), tracking/verifying a user through an interactive connection with the user's reception device (i.e., through an application running on user's reception device, regardless of whether the program for the application is independent or web based (i.e., java, javascript, etc.)), tracking/verifying users through a reception device's IP address, and tracking/verifying users by providing the user's reception device with a "cookie."

Once the authorization application 352 verifies that the reception device 110 is an authorized reception device (e.g., by receiving password data), then the authorization application 352 is further adapted to provide the filtering application 324 with authorization data (not shown) and provide the reception device 110 with redirect (or refresh) data such that the reception device 110 requests the IP address originally requested from the DNS server 120 (i.e., the IP address for "sex.com"). The filtering application 324 operating on the DNS server 120 is further adapted to provide the reception device 110 with the requested IP address (i.e., the IP address for "sex.com", which is "209.81.54.5") after the authorization data (not shown) has been received.

If the user is identified as a first time user, the reception device 110 may be provided with request-for-credit-card data (i.e., verifying a user through their credit card account), which may require the user to provide the authorizing application 352 with user-identification data and password data (i.e., for future access). The user-identification data is then stored in an empty cell located under the user identification column 410 of the preferred look-up table 400, and the password data is stored in an empty cell located under the password column 470 of the preferred look-up table 400. With regard to the domain names that do not require a password (e.g., "cnn.com", "microsoft.com", and "msnbc.com"), the filtering application 324 may either affirmatively recognize that no password is required by linking no-password-required data (e.g., "NO") to the particular domain name, or merely understand that no password is required when password-required data (e.g., "YES") is not linked to a particular domain name.

Although the authorization application 324 might provide user-verification data to a reception device 110 that previously requesting an IP address for a password-required domain name (e.g., "sex.com"), it should be appreciated that the reception device 110 may also directly request user-verification data (e.g., request-for-credit-card data, request for user-identification data, request-for-password data, etc.) from the authorization server 350. This would allow the reception device 110 to be verified as an authorized reception device before the reception device 110 requested an IP address for a password-required domain name (e.g., "sex.com").

Figure 5:
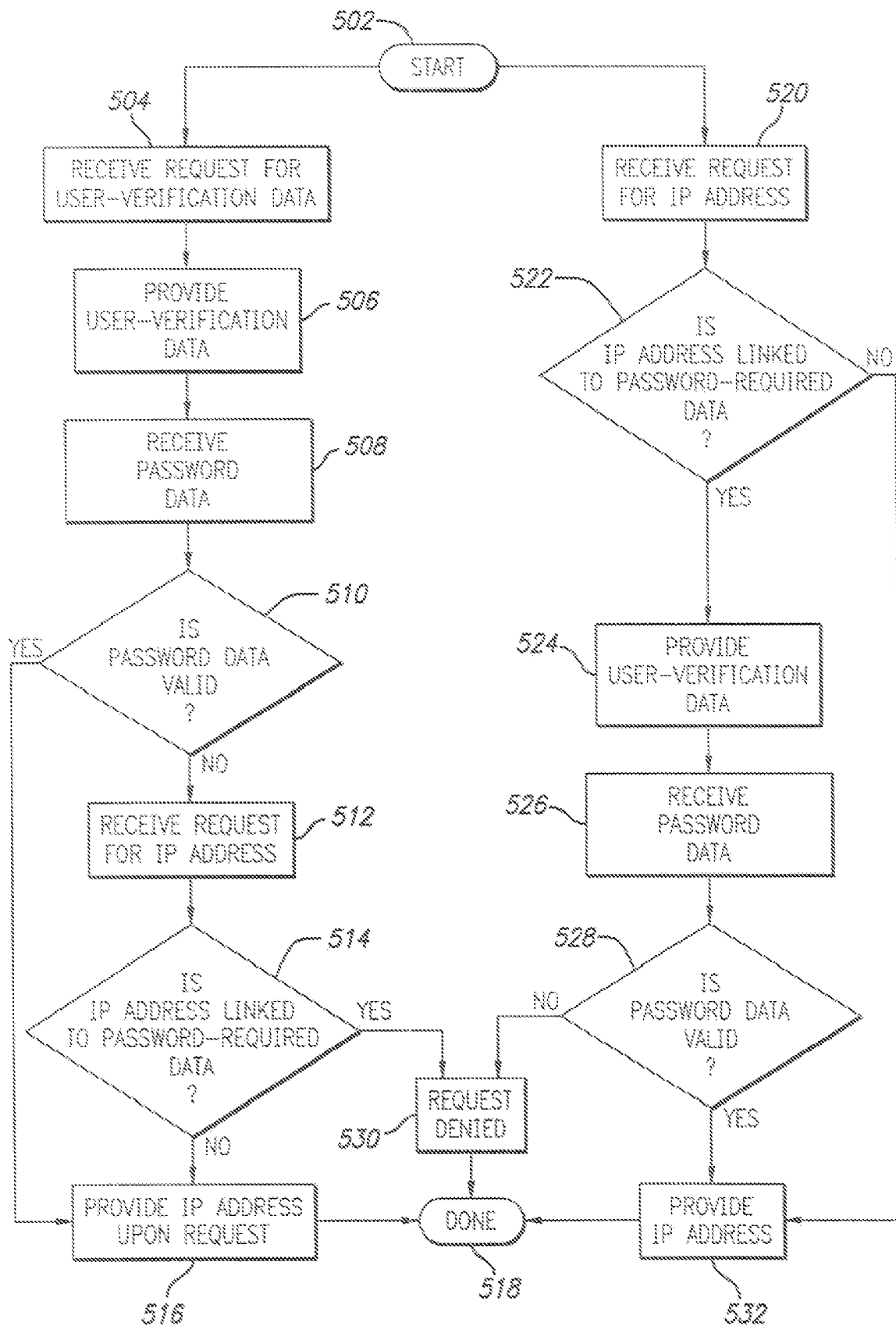
FIG. 5 is a flow diagram illustrating how the DNS server system of the present invention can provide IP address data to at least one reception device.

FIG. 5 is a flow chart illustrating the steps that the DNS server system of the present invention may perform when a request for an IP address is received. More particularly, and beginning at step 502, the authorization server may receive a request from a reception device for user-verification data (such as request-for-password data) at step 504. The authorization server responds to such a request by providing user-verification data (such as request-for-password data) to the reception device at step 506. The authorization server may then receive password data from the reception device at step 508, where the authorization server should determine whether such password data is valid at step 510. If the password data is valid (i.e., the authorization server provides authorization data to the DNS server), then a subsequent request for an IP address (at the DNS server) will be granted at step 516, which completes the process at step 518. Alternatively, if the password data is invalid, then a subsequent request for an IP address (at the DNS server) may be received at step 512. The DNS server should determine whether the IP address (or a corresponding domain name) is linked to password-required data at step 514. If the IP address is linked to password-required data, then the request is denied at step 530, which completes the process at step 518. If the IP address is not linked to password-required data (or is linked to no-password-required data), the request is granted at step 516, which completes the process at step 518.

Alternatively, beginning at step 502, the DNS server may receive a request from a reception device for an IP address at step 520. The DNS server must then determine whether that IP address (or a corresponding domain name) is linked to password-required data at step 522. If the IP address is not linked to password-required data (or is linked to no-password-required data), then the request is granted at step 532, which completes the process at step 518. If the IP address is linked to password-required data, then the authorization server should provide the reception device with user-verification data (such as request-for-password data) at step 524. The authorization server may then receive password data from the reception device at step 526, where the authorization server should determine whether such password data is valid at step 528. If the password data is valid (i.e., the authorization server provides authorization data to the DNS server), then the request for an IP address (at the DNS server) is granted at step 532, which completes the process at step 518. If the password data is invalid, then the request (at the DNS server) is denied at step 530, which completes the process at step 518.

Referring back to FIGS. 3 and 4, the filtering application 324 may further be adapted to receive pseudo-domain-name data, which can be stored in a pseudo-domain name column 430 of the preferred look-up table 400. It should be appreciated that the pseudo-domain-name data may be provided by other entities (other than the reception device 110) including, but not limited to, a content server 140 or a system administrator (not shown) of the DNS server system 300. If the filtering application 324 receives pseudo-domain-name data pertaining to a particular domain name, then the filtering application 324 is further adapted to store a link between the pseudo-domain-name and the particular domain name in the memory device 326 (i.e., in the preferred look-up table 400 that may be located (in-part) in the memory device 328). It should be appreciated that the pseudo-domain-name data may alternatively pertain to a particular IP address, such that a link is stored between the pseudo-domain-name data and the pertaining IP address. Either form may be acceptable due to the fact that each domain name is already associated with a particular IP address.

If the filtering application 324 receives pseudo-domain-name data (e.g., "news") pertaining to a particular domain name (e.g., "cnn.com"), then the filtering application 324 is further adapted to store a link between the pseudo-domain-name data and the pertaining domain name in the memory device 326. If a reception device 110 subsequently requesting an IP address for the pseudo-domain-name data (e.g., "news"), the reception device 110 will be provided with the IP address of the particular domain name (e.g., "cnn.com"). Alternatively, if the filtering application 324 has not received pseudo-domain-name data (e.g., "news") pertaining to a particular domain name, then the filtering application 324 may be adapted to provide the reception device 110 with an IP address for the authorization server 350. The authorization application 352 operating on the authorization server 350 may be adapted to provide the reception device 110 with user-verification data (as discussed above) in order to link the pseudo-domain-name data (e.g., "news") to a particular user.

This allows the authorization application 352 (together with the filtering application 324) to subsequently provide that particular user (e.g., "George") with an IP address for the particular domain name (e.g., "cnn.com") when the user requests an IP address for the pseudo-domain-name data (e.g., "news").

For example, referring to FIG. 4, if pseudo-domain-name data "news" is received pertaining to "cnn.com", then the pseudo-domain-name data "news" will be stored in the pseudo domain name column 430 such that it is linked with the pertaining domain name (i.e., "cnn.com"). If a user (e.g., "George" or "Michael") subsequently requesting an IP address for "news," they would be provided with the IP address of "cnn.com" (i.e., "207.24.245.178"). Alternatively, if this data (i.e., pseudo-domain-name data) was not provided to the filtering application 324, then the filtering application 324 would provide the reception device 110 with an IP address for the authorization server 350. This authorization application 352 operating on the authorization server 350 is then adapted to provide the reception device 110 with user-verification data (as discussed above) in order to link the pseudo-domain-name data (i.e., "news") previously stored to a particular use (i.e., "George"). This allows the authorization application 352 (together with the filtering application 324) to subsequently provide "George" the IP address for "cnn.com" (i.e., 207.24.245.176") when "George" requests the IP address for "news". This also would allow the authorization application 352 (together with the filtering application 324) to provide "Michael" with the IP address for "msnbc.com" (i.e., "207.46.232.38") when "Michael" requests the IP address for "news" (assuming "Michael" set up a link between "news" and "msnbc.com"). Similarly, the authorization application 352 (together with the filtering application 324) may provide "George" with the IP address for "microsoft.com" (i.e., "213.199.144.151") when "George" requests the IP address for "software" (again, assuming "George" set up a link between "software" and "microsoft.com").

With regard to domain names that do not have a corresponding pseudo-domain-name (e.g., "sex.com"), the filtering application 324 may either affirmatively recognize that no pseudo-domain-name is linked to a particular domain name by linking no-pseudo-linking data (e.g., "NO") to the particular domain name, or merely understand that no pseudo-domain-name is linked to a domain name when pseudo-linking data (e.g., "YES") is not linked to a particular domain name.

The authorization application 352 may further be adapted to receive pseudo-linked data, which can be stored in the pseudo-link column 420 of the look-up table 400. The pseudo-link data may be used by the authorization application 352 to link pseudo-domain-name data to particular domain names. The authorization application 352 may further be adapted to receive circumventing data in order to temporarily masks the pseudo-linked data. This would require the reception device 110 to provide the DNS server 320 the actual domain name in order to receive the IP address associated with the actual domain name.

Figure 6:
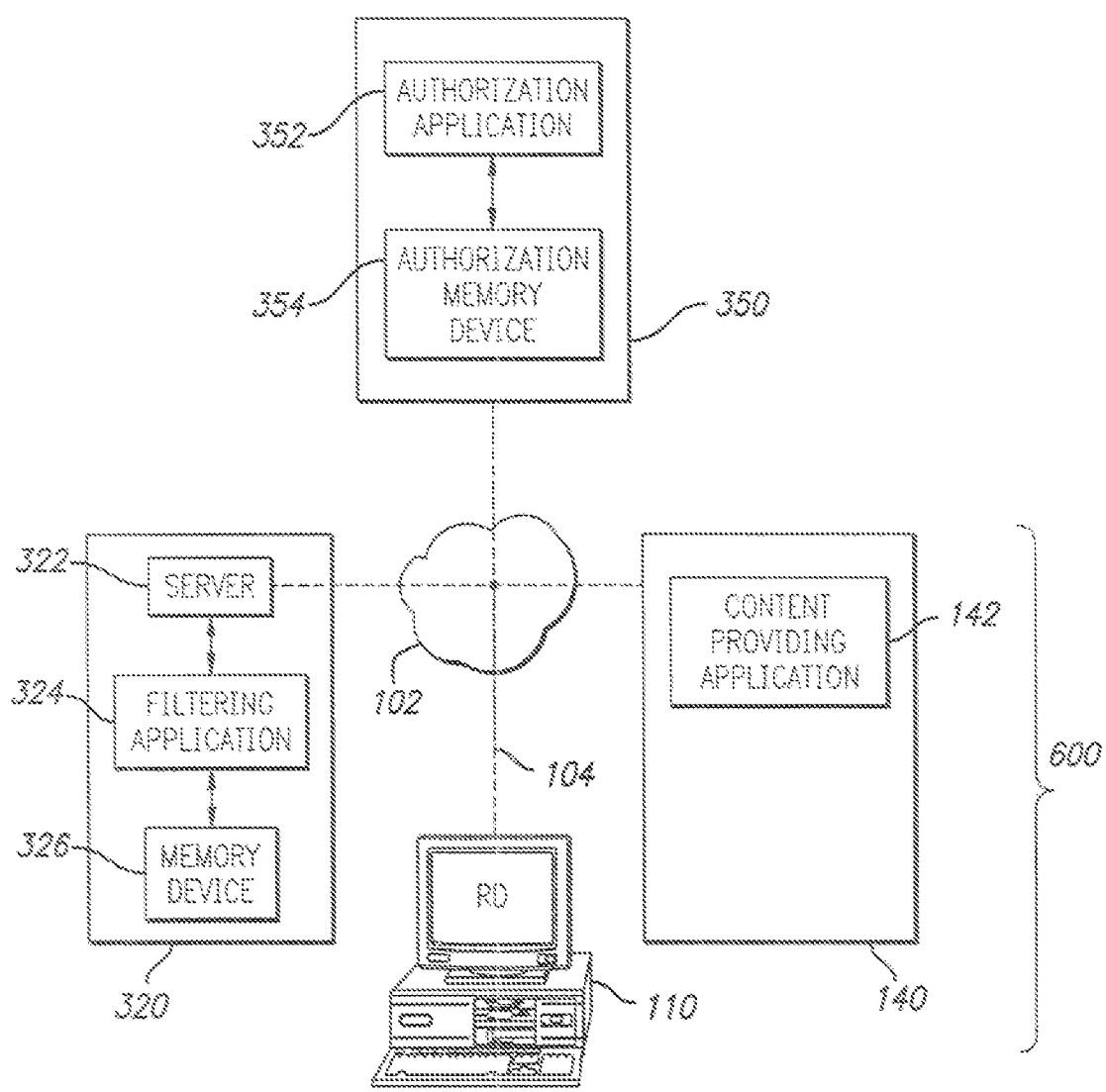
FIG. 6 is block diagram illustrating another embodiment of the DNS server system of the present invention.

FIGS. 6 and 7, respectively, illustrate another embodiment of the DNS server system 600 of the present invention and an alternative look-up table 700 stored on the memory device 326 operating on the DNS server 320. In this embodiment, the authorization application 354, which may operate in the same manner as discussed above, is further adapted to provide encoded data to the reception device 110 after the reception device 110 has provided verification data, such that the reception device 110 can subsequently provide the encoded data to a content server 140 operating on a requested IP address. Although it should be appreciated that this encoded data may be encoded into any data that is subsequently provided to the content server 140 (such as the user's IP address, the time of access, etc.) it is a preferred method of this invention to encoded the uniform resource locator (URL) (which is the address that defines the route to a particular file) such that it points to an alternate file on the content server 140. The URL is encoded (or redirected) such that it (or a coded token within it) can be recognized (or searched for) by a content providing application 142 operating on the content server 140.

For example, referring to FIG. 7, "sex.com" is linked to a particular user (i.e., "George") and password-required data (e.g., "YES"). Thus "George" (once identified) will have to provide the authorization application 352 with password data (or some other authorization data) in order to receive the IP address associated with "sex.com" (i.e., 209.81.54.5"). If "George" provides invalid password data, the filtering application may still provide "George" with the IP address associated with "sex.com" (i.e., "209.81.54.5"), however, the authorization application 352 will further inform "George" (or his reception device 110) that the content data he is looking for has moved, and provide him with a predetermined redirected URL (i.e., "filtered.sex.com," which is stored under the redirected domain name column 790 of the look-up table 700).

By providing the user (i.e., "George") with the IP address for "sex.com" (i.e., "209.81.54.5"), the user is then enabled to communicate with the content server 140 operating on the "sex.com" IP address. However, because the request for content data will contain the redirected URL, the content providing application 142 operating on the content server 140 will detect the redirected URL, either because the redirected URL points to a recognizable filtered file, or because the content providing application 142 is adapted to search the URL for a predefined word or code (e.g., "filtered"). This allows the content providing application 142 operating on the content server 140 to filter content data before it is provided to any reception device (e.g., 110) that previously received IP address information from the DNS server 320 of the present invention.

To prevent a user from easily circumventing the DNS server system 600, the content providing application 142 may further be adapted to deny requests for content data where the request contains an IP address. Thus, if a user typed an IP address directly into a browser application (not shown), the browser would request content data directly from a content server operating on that IP address (i.e., circumventing the DNS server). However, the content providing application 142 can detect whether the request is a URL (or domain name) request or an IP address request. Thus, if the content providing application 142 detects an IP address within the request for content data (i.e., indicating that the DNS server was circumvented) then the request may be denied.

Figure 8:
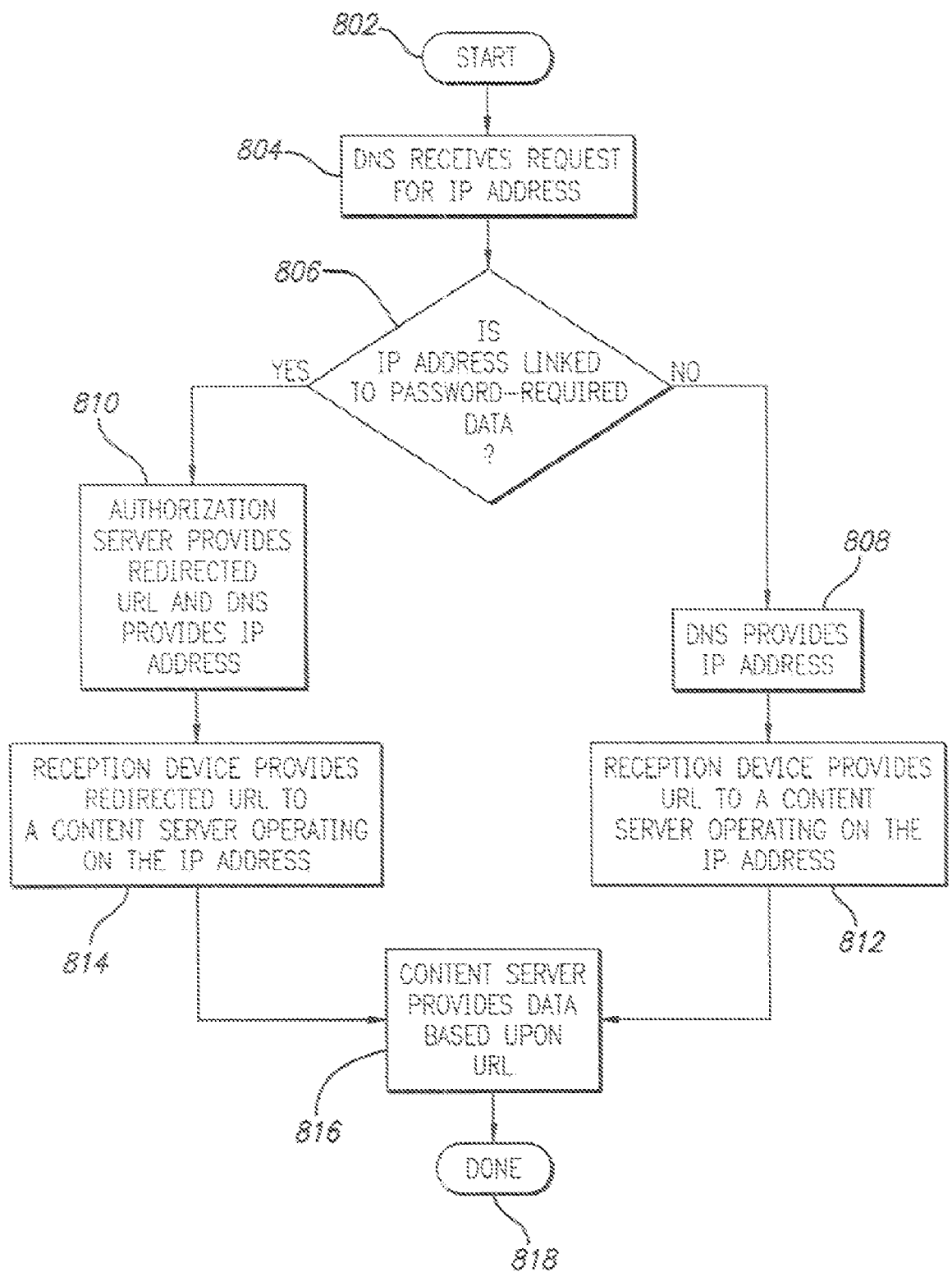
FIG. 8 is a flow diagram illustrating how the DNS server system of the present invention can provide IP address and content data to at least one reception device.

FIG. 8 is a flow chart illustrating how an IP address and content data residing at that IP address may be provided to a reception device. More particularly, and beginning at step 802, the DNS server may receive a request from a reception device for an IP address at step 804. The DNS server should then determine whether the requested IP address (or domain name) is linked to password-required data at step 506. If the IP address (or domain name) is not linked to password-required data (or is linked to no-password-required-data), then the DNS server provides the reception device with the requested IP address at step 808. The reception device then provides a URL (i.e., content data) request to a content server operating on the IP address at step 812. The content server then provides the reception device with content data based upon the URL request at step 816, which completes the process at step 818. Alternatively, if the IP address (or domain name) is linked to password-required data, then the authorization server provides the reception device with a redirected URL and the DNS server provides the reception device with the requested IP address at step 810. The reception device then provides a redirected URL (i.e., content data) request to a content server operating on the IP address at step 814. The content server then provides the reception device with content data based upon the redirected URL request at step 816, which completes the process at step 818.

In another embodiment, referring back to FIGS. 6 and 7, the authorization application 352 provides the reception device 110 with a redirected URL only after a valid password has been entered. This allows the content providing application 142 operating on the content server 140 to recognize different levels of security, and thus provide different levels of content data.

For example, a variety of content data may be residing on a content server (e.g., 140) operating on an IP address associated with the domain name "adult.com" (i.e., "216.99.40.3"), where the content data can be classified at "rated G," "rated PG," "rated R," and "rated X." To enable certain reception devices (or users) to receive content data that does not exceed a predetermined rating level, the content providing application 142 is adapted to recognize a level one through four rating, where level one corresponds to "G" rated content data and level four corresponds to "X" rated content data. Thus, if "Michael", request the IP address associated with "adult.com" (i.e., "216.99.40.3"), the filtering application 324 will provide "Michael" with the requested IP address, along with a redirected URL (i.e., "level3. adult.com"). This redirected URL (i.e., "level3. adult.com") can be used by the content providing application 142 operating on the content server 140 to provide "Michael" with content data that does not exceed "rated R" content data.

The content providing application 142 operating on the content server 140 may further be adapted to reward the reception device 110 for using the DNS server (or a pseudo-domain-name) to locate the IP address of the content server 140. It should be appreciated that these rewards may include redeemable points, monetary kickbacks, discounted services and/or products or any other savings or special benefits generally known to those skilled in the art.

Having thus described a preferred embodiment of a system and method for filtering content data over a wide area network, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method for controlling access to IP addresses for content using a domain name system, comprising the steps of:

receiving requests for content at a name server from a plurality of network devices, wherein the name server is configured to receive requests for content from the plurality of network devices via a wide area network and is operably associated with a first memory holding a domain name table, the domain name table listing IP addresses for network content servers in association with domain names and with device identifiers for the network devices, and wherein each request for content comprises a domain name and a device identifier;

determining, for ones of the requests for content, using the domain name table, corresponding ones of authorized network addresses each associated with a device identifier and a requested domain name in the domain name table, for each request in which the device identifier in the domain name table matches a device identifier included in the request, wherein the authorized network addresses comprise IP addresses; and responding to the requests for content by providing the authorized network addresses to requesting ones of the plurality of network devices.

2. The method of claim 1, further comprising determining, for other ones of the requests, default network addresses each associated with a requested domain name in the domain name table and not with a device identifier, for each request in which the device identifier included in the request does not match a device identifier associated with a domain name in the domain name table, and responding to the requests by providing the default network addresses to requesting ones of the plurality of network devices.

3. The method of claim 2, further comprising operating an authorization server in communication with the name server and with the plurality of network devices via the wide area network, wherein the authorization server is operably associated with a second memory holding an authorization application, the authorization application operable to verify user access privileges for each of the requests.

4. The method of claim 2, further comprising obtaining authorization data from the plurality of network devices for verifying user access privileges.

5. The method of claim 4, further comprising providing the authorization data to the name server.

6. The method of claim 4, further comprising obtaining payment information from users requesting access to specified content.

7. The method of claim 4, further comprising obtaining information from users, the information selected from the group consisting of a user password and the device identifier.

8. The method of claim 4, further comprising providing the default network address in response to requests for which authorization data indicates that the user is not authorized to receive unfiltered information.

9. The method of claim 4, further comprising providing a message indicating that access to requested content is not authorized in response to requests for which the authorization data indicates that the user is not authorized to receive requested information.

10. The method of claim 4, further comprising providing the default network address in response to requests for which authorization data matching the authorization data in the domain name table is not received.

11. The method of claim 1, further comprising rewarding users for designating the name server as their default name server for handling domain name requests.

12. The method of claim 1, further comprising communicating an authorization status to content servers via redirected domain names associated with the domain names in the domain name table.

13. A system for directing access to content over a wide area network, comprising:

a name server configured to receive requests for content from a plurality of network devices via a wide area network, wherein the name server is operably associated with a first memory holding a domain name table, and wherein the domain name table associates P addresses for network content servers with domain names and device identifiers, the name server comprising instructions operable for:

receiving requests for content at a name server from a plurality of network devices, wherein each request for content comprises a domain name and a device identifier;

determining, for ones of the requests for content, using the domain name table, corresponding ones of authorized network addresses each associated with a device identifier and a domain name in the domain name table, for each request in which the device identifier in the domain name table matches a device identifier included in the request, wherein the authorized network addresses comprise IP addresses; and responding to the requests for content by providing the authorized network addresses to requesting ones of the plurality of network devices.

14. The system of claim 13, wherein the name server further comprises instructions for determining, for other ones of the requests, default network addresses each associated with a requested domain name in the domain name table and not with a device identifier, for each request in which the device identifier included in the request does not match a device identifier associated with a domain name in the domain name table, and responding to the requests by providing the default network addresses to requesting ones of the plurality of network devices.

15. The system of claim 14, further comprising an authorization server in communication with the name server and with the plurality of network devices via the wide area network, wherein the authorization server is operable to obtain authorization data from the plurality of network devices for verifying user access privileges.

16. The system of claim 14, wherein the authorization server is further operable to provide authorization data to the name server.

17. The system of claim 14, wherein the authorization server is further operable to obtain payment information from users requesting access to specified content.

18. The system of claim 14, wherein the authorization server is further operable to obtain information from users, the information selected from the group consisting of a user password and the device identifier.

19. The system of claim 15, wherein the instructions of the name server are further operable to provide the default network address in response to requests for which the authorization data indicates that the user is not authorized to receive unfiltered information.

20. The system of claim 15, wherein the instructions of the name server are further operable to provide a message indicating that access to requested content is not authorized in response to requests for which the authorization data indicates that the user is not authorized to receive requested information.

21. The system of claim 15, wherein the instructions of the name server are further operable to provide the IP address together with the redirected domain name in response to requests for which authorization data matching the authorization data in the domain name table is not received.

22. The system of claim 13, wherein the instructions of the name server are further operable to reward users for designating the name server as their default name server for handling domain name requests.

23. The system of claim 13, further comprising at least one content server in communication with the name server, the content server configured to determine a user authorization status based on redirected domain names provided by the name server as associated with domain names in the domain name table.

24. A computer-readable medium having computer readable instructions stored thereon for execution by a signal processor to perform a method comprising:

receiving requests for content at a name server from a plurality of network devices, wherein the name server is configured to receive requests for content from the plurality of network devices via a wide area network and is operably associated with a first memory holding a domain name table, the domain name table listing IP addresses for network content servers in association with domain names and with device identifiers for the network devices, and wherein each request for content comprises a domain name and a device identifier;

determining, for ones of the requests for content, using the domain name table, corresponding ones of authorized network addresses each associated with a device identifier and a requested domain name in the domain name table, for each request in which the device identifier in the domain name table matches a device identifier included in the request, wherein the authorized network addresses comprise IP addresses; and responding to the requests for content by providing the authorized network addresses to requesting ones of the plurality of network devices.

25. The computer-readable medium of claim 24 having computer readable instructions stored thereon for execution by a signal processor to perform a method, the method further comprising determining, for other ones of the requests, default network addresses each associated with a requested domain name in the domain name table and not with a device identifier, for each request in which the device identifier included in the request does not match a device identifier associated with a domain name in the domain name table, and responding to the requests by providing the default network addresses to requesting ones of the plurality of network devices.

26. The computer-readable medium of claim 24 having computer readable instructions stored thereon for execution by a signal processor to perform a method, the method further comprising operating an authorization server in communication with the name server and with the plurality of network devices via the wide area network, wherein the authorization server is operably associated with a second memory holding an authorization application, the authorization application operable to verify user access privileges for each of the requests.

27. The computer-readable medium of claim 24 having computer readable instructions stored thereon for execution by a signal processor to perform a method, the method further comprising obtaining authorization data from the plurality of network devices for verifying user access privileges.

28. The computer-readable medium of claim 24 having computer readable instructions stored thereon for execution by a signal processor to perform a method, the method further comprising providing the authorization data to the name server.

29. The computer-readable medium of claim 24 having computer readable instructions stored thereon for execution by a signal processor to perform a method, the method further comprising obtaining payment information from users requesting access to specified content.

30. The computer-readable medium of claim 24 having computer readable instructions stored thereon for execution by a signal processor to perform a method, the method further comprising obtaining information from users, the information selected from the group consisting of a user password and the device identifier.

31. The computer-readable medium of claim 24 having computer readable instructions stored thereon for execution by a signal processor to perform a method, the method further comprising providing the default network address in response to requests for which authorization data indicates that the user is not authorized to receive unfiltered information.

32. The computer-readable medium of claim 24 having computer readable instructions stored thereon for execution by a signal processor to perform a method, the method further comprising providing a message indicating that access to requested content is not authorized in response to requests for which the authorization data indicates that the user is not authorized to receive requested information.

33. The computer-readable medium of claim 24 having computer readable instructions stored thereon for execution by a signal processor to perform a method, the method further comprising providing the default network address in response to requests for which authorization data matching the authorization data in the domain name table is not received.

34. The computer-readable medium of claim 24 having computer readable instructions stored thereon for execution by a signal processor to perform a method, the method further comprising rewarding users for designating the name server as their default name server for handling domain name requests.

35. The computer-readable medium of claim 24 having computer readable instructions stored thereon for execution by a signal processor to perform a method, the method further comprising communicating an authorization status to content servers via redirected domain names associated with the domain names in the domain name table.

* * * * *

UNITED STATES PATENT AND TRADEMARK OFFICE
CERTIFICATE OF CORRECTION

| | | |
|---|---|---|
| PATENT NO. | : 7,406,708 B2 | Page 1 of 1 |
| APPLICATION NO. | : 11/681051 | |
| DATED | : July 29, 2008 | |
| INVENTOR(S) | : Gary S. Shuster | |

It is certified that error appears in the above-identified patent and that said Letters Patent is hereby corrected as shown below:

Claim 13, Column 14, line 64, delete "P" and insert -- IP --.

Signed and Sealed this

Fourteenth Day of October, 2008

JON W. DUDAS
*Director of the United States Patent and Trademark Office*